March 10, 1925.

C. H. LEINERT 1,529,440

VALVE FOR COMPRESSORS

Filed Sept. 24, 1923

Witness:

Inventor:
Charles H. Leinert,
by
Attys

Patented Mar. 10, 1925.

1,529,440

UNITED STATES PATENT OFFICE.

CHARLES H. LEINERT, OF CHICAGO, ILLINOIS, ASSIGNOR TO LEINERT VALVE COMPANY, OF CHICAGO, ILLINOIS, A CORPORATION OF ILLINOIS.

VALVE FOR COMPRESSORS.

Application filed September 24, 1923. Serial No. 664,497.

*To all whom it may concern:*

Be it known that I, CHARLES H. LEINERT, a citizen of the United States, residing at Chicago, in the county of Cook and State of Illinois, have invented certain new and useful Improvements in Valves for Compressors, of which the following is a specification.

This invention relates to a valve, either suction or discharge, which is particularly adapted for use with compressors and blowing engines. It is of the general kind shown and described in my Patent No. 1,240,461, but differs therefrom in a number of respects which will hereinafter be pointed out.

In the present invention, I have aimed to provide means for guiding the valve disk in its movements between the seat and stop plate such that friction will be reduced to a minimum; to so construct the valve seat, as well as the disk and guiding means therefor, that either of these parts may be reversed in its position relative to the associated parts; to protect and secure the exposed ends of the valve springs in a simple and efficient manner; and to so treat the material forming the valve seat as to harden its wearing surfaces, thereby prolonging the serviceable life of the valve.

Various objects and purposes such as the above are contemplated in the present invention, as are also others which will hereinafter appear. In the description to follow, reference will be made to the accompanying drawing which exhibits a preferred embodiment of my invention in the manner following:

Figure 1:
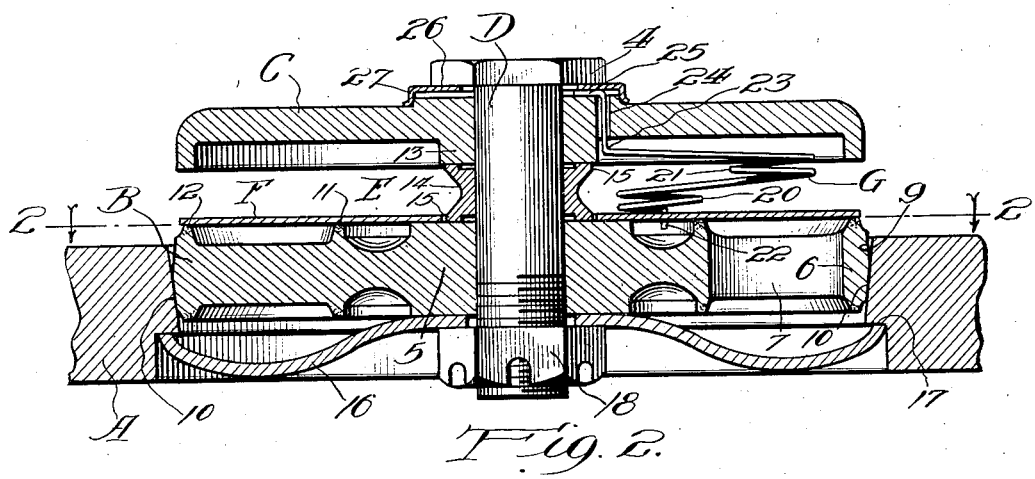
Figure 1 is an axial section through the valve assembly taken on line 1—1 of Fig. 2.
Figure 2:
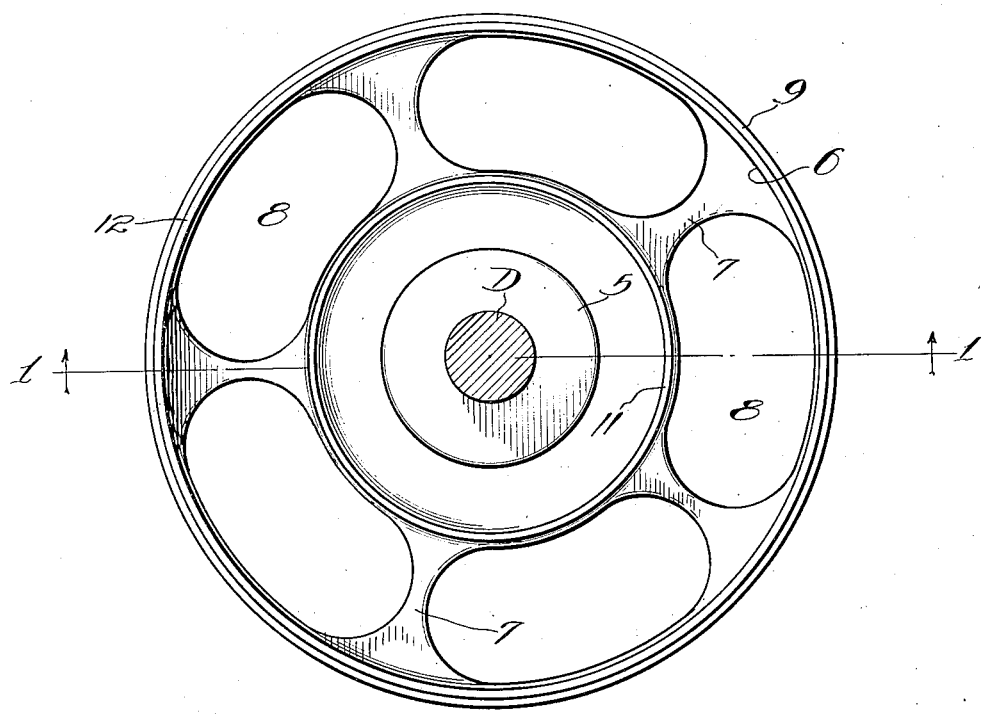
Fig. 2 is a transverse section therethrough on line 2—2 of Fig. 1.

A valve such as this invention is concerned with is particularly suitable for use with blowers of the type which are commonly employed for the discharge of relatively large volumes of air at comparatively low pressures. Such blowers are generally operated at high speed, so that the check valves controlling the inlet and discharge ports for air are also reciprocated at high speed. Owing to conditions such as these, the valves are subjected to hard usage which results in their frequent wearing out, and a consequent necessity for their renewal or repair. It is accordingly an object of this invention to provide for this kind of service a check valve which is inexpensive, efficient, long-lived, and which may be easily and quickly repaired or renewed whenever necessary, without shutting down operation of the compressor for any extended period.

Referring to the drawing, I have shown a discharge valve which is adapted for attachment directly to a compressor wall A, or to a cage which is carried thereby, the valve assembly including a seat member B with which is associated a stop plate C detachably connected to the seat as through the medium of a bolt D, the head 4 of which rests against the outer side of the stop plate, as shown. Interposed between these parts is a distance piece E which may also serve as a centering means for a reciprocable valve plate F in the form of a disk against which a constant pressure is exerted by means of springs G, the disk being thereby held normally upon its seat. The parts just enumerated are the principal ones which enter into the construction of this valve, but they are specially formed to co-operate with each other in a peculiar manner, as will now be explained.

The body of the seat member comprises a hub 5, a rim 6, and connecting webs or spokes 7 between which are arcuate-shaped openings 8 having an aggregate area which, by preferance, is the maximum obtainable with due regard to strength and safety. On the outer periphery of the rim are formed two angular surfaces 9 and 10, oppositely tapered so as to meet in a plane which is substantially midway of the body length at which point the seat member is of the greatest diameter. Due to this construction, as well as its formation elsewhere, the seat member may be fitted upon the wall A of a compressor, or cage carried thereby, with either of its ends proximate thereto. The valve is thereby reversible in character.

Each end of the seat member, which is a counterpart of the other, is formed to provide for the valve plate a seat which may comprise inner and outer annular ribs 11 and 12 respectively. The hub ends are also shown to terminate in a plane which is coincident with these ribs so that the plate is supported thereupon as well. The bolt D which I have suggested as a convenient means for attaching the stop plate to the seat member permits these parts to be readily disconnected whenever desired. I preferably interpose between these parts a distance piece E in the form of a bushing which bears with one end against the hub 5 of the seat member and with its other end against a hub 13 that is formed centrally of the stop plate. This bushing extends through a central aperture in the valve plate so as to have capacity for centering the latter in either of its extreme positions. The periphery of this distance piece is shown as formed with an annular groove 14, and provides adjacent its opposite ends faces 15, substantially parallel with the valve axis, which lie normaly close to, but not in engagement with, the surrounding edges of the disk. Between these faces the grooved portion of the bushing is so recessed as to lie further from the valve disk during its travel from one position to the other. Owing to this construction, the disk movements will normally be frictionless, but in case of sufficient decentering will be guided to a central position in approaching either the stop plate or seat member.

In the mounting of the valve assembly within a wall of the compressor, or cage carried thereby, it will be found convenient to make use of a bridge piece 16 which rests against the inner end of the valve seat. The ends of this bridge piece are adapted to engage with an annular shoulder 17 which is provided in the wall opening wherein the valve is secured, and the bolt D which extends through a central opening in the bridge piece serves to hold the seat member securely in position when the nut 18 is tightened thereupon. With removal of the nut from the bolt the valve may be completely disassembled and its seat member reversed in position within the cylinder walls; also the distance piece and valve disk may be similarly repositioned. Owing to the reversibility of these parts, the service of the valve may be prolonged over a period which is considerably greater than that usually possible with devices of this kind.

The stop plate is suitably ported to afford greater area for the passage of air therethrough. The spring means G extending between this element and the disk may be of any desired construction, that shown in the drawing comprising a wire suitably coiled as at 20 and 21, to enhance its spring action. One wire end 22 is shown as bent for projection through a suitable opening in the valve disk while the other wire end 23 is extended in an opposite direction to pass through an opening 24 which is provided in the stop plate adjacent its hub. The extremity 25 of this end of the wire is again bent to rest upon the hub at the outer end of the stop plate, and over this hub is arranged a cap 26 having flanged walls 27 turned toward the stop plate. As many springs F may be employed as are found desirable, three being a convenient number, and since the construction of each is identical with the others, it will be understood that the several wire extremities 25 are clamped beneath the cap 26 upon which pressure is exerted by the bolt head, as shown. The disassembly of the valve need not involve any displacement of the several springs, since these may be handled as a unit, together with the stop plate; the spring ends 22 can be readily disengaged from the valve disk permitting this latter element to be reversed, and the spring ends to be again entered therethrough but from the opposite side thereof.

Owing to the frequent and violent reciprocations of the valve disk, difficulty is frequently experienced in preserving over any great length of time a tight engagement between the disk and its seat. This is due in large part to the wearing down of the contact faces of the seat, which, in the construction shown, are in the form of annular ribs. The seat member, according to my invention, may be conveniently formed from forged steel, .35 carbon, which I then subject to the proper heat treatment for hardening the seat faces of the ribs 11 and 12. In so doing, the rib faces are still left a trifle less hard than the valve disk. To bring this out clearly in the drawing, I have stippled in Fig. 1 those portions of the ribs which are so affected by the heat treatment. Not only is it possible to produce such a seat member at less expense than formerly, but its serviceable life is greatly prolonged. The hammering action of the disk will, of course, result in a certain amount of wear, but this takes place principally on the valve seat so that the disk is spared.

Figure 3:
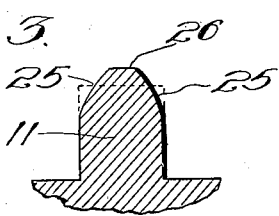
Fig. 3 is an enlarged sectional detail, showing a modified formation of valve seat.

In Fig. 3 I have shown an enlarged sectional view of a modified form of rib 11 with which the valve disk makes contact. Its two sides are preferably rounded off, as at 25, to meet with a flattened end 26 of reduced size. When such a construction is used, the hammering action of the disk over a period of use will displace the metal of the rib into a shape somewhat as is represented by the dotted lines in this figure. This is desirable, inasumch as it avoids a spreading out of the contact area of the rib with a resultant imperfect seating of the disk thereupon.

While I have shown and described a single form in which the invention may be embodied, it is obvious that its several improved features may be otherwise constructed. Accordingly, I would include within the scope of this patent such other constructions and modifications as fall within the purview of the claims following:

I claim:

1. In a valve of the kind described, the combination of a seat member, a stop plate in spaced relation thereto, a valve disk adapted to reciprocate therebetween, a detachable connection between the seat member and stop plate, and means for spacing the seat member from the stop plate comprising a distance piece arranged to present one of its opposite ends against each of these parts, there being an axial opening in the valve disk through which the distance piece is extended, the periphery of the distance piece being so formed as to engage with the disk only when the same is moved to a position adjacent either the seat member or stop plate, whereby the distance piece serves as a centering means therefor at such places only, substantially as described.

2. In a valve of the kind described, the combination of a seat member, a stop plate spaced therefrom a valve disk reciprocable therebetween, and a distance piece extended through an opening in the valve plate to lie between the seat member and valve plate, the periphery of the distance piece being recessed intermediately of its ends, and being so formed adjacent its ends as to cooperate with the valve disk to center the same relative to the seat member and stop plate, the valve disk being elsewhere free of contact with the distance piece, substantially as described.

3. In a valve of the kind described, the combination of a seat member, a stop plate spaced therefrom, a distance piece therebetween, means connecting these several parts, a valve disk positioned for reciprocation between the seat member and the stop plate, the disk having a central opening through which the distance piece is extended and engaging therewith at each of its extreme positions in a manner to be centered relative to the seat member or stop plate, the periphery of the distance piece being recessed intermediately of its ends whereby the disk is assured of a frictionless movement through the major portion of its travel, substantially as described.

4. In a valve of the kind described, the combination of a seat member, a stop plate spaced therefrom, and a valve disk reciprocable therebetween, the seat member being formed with certain upstanding integral portions providing a seat whereon the disk is adapted to rest, and the material composing the said member being so treated as to harden its seat portions to an extent greater than the remainder of said member, but to an extent less than the material composing the disk, substantially as described.

5. In a valve of the kind described, the combination of a seat member, a stop plate spaced therefrom, and a valve disk reciprocable therebetween, the seat member being formed with certain upstanding portions providing a seat whereon the disk is adapted to rest, and the material composing the said member being so treated as to harden its seat portions to an extent greater than the remainder of said member, substantially as described.

6. In a valve of the kind described, the combination of a seat member, a stop plate spaced therefrom, and a valve disk reciprocable therebetween, the seat member being formed with certain upstanding ribs providing a seat whereon the valve disk is adapted to rest, and the material composing said ribs being softer than the material in the valve disk whereby the wear on the ribs will exceed that on the disk, the sides of said ribs being formed with a slight inward taper whereby displacement of the metal will tend to straightening of the walls thereof as its seat face is hammered down, substantially as described.

7. In a valve of the kind described, the combination of a seat member, a stop plate spaced therefrom, and a valve disk reciprocable therebetween, the seat member being formed with certain upstanding ribs providing a seat whereon the valve disk is adapted to rest, and the material composing said ribs being softer than the material in the valve disk whereby the wear on the ribs will exceed that on the disk, substantially as described.

8. In a valve of the kind described, the combination of a seat member, a stop plate spaced therefrom, and a valve disk reciprocable therebetween, the seat member being provided with certain ribs whereon the disk is adapted to rest and the material forming said ribs being hardened to an extent greater than the remainder of the seat member, but to an extent less than the material composing the disk, substantially as described.

9. In a valve of the kind described, the combination of a seat member, a stop plate spaced therefrom, a disk mounted for reciprocation therebetween, spring means between the disk and the stop plate extended for partial exposure upon the outer side of the stop plate, a cap overlying the exposed spring parts to protect the same, and a bolt connection between the stop plate and seat member adapted also to secure the cap in place, substantially as described.

10. In a valve of the kind described, the combination of a seat member, a stop plate spaced therefrom, a valve disk reciprocable therebetween, spring means interposed between the disk and stop plate extended for exposure in part upon the outer side of the latter, and a cap having means for attachment to the stop member adapted to overlie the exposed parts of the spring means to protect the same, substantially as described.

11. In a valve of the kind described, the combination of a seat member, a stop plate spaced therefrom, a valve disk reciprocable therebetween, spring means interposed between the valve disk and stop plate extended for exposure in part upon the outer side of the stop plate, and protecting means arranged over the exposed parts of the spring means, substantially as described.

CHARLES H. LEINERT.

Witness:
EPHRAIM BANNING.